(12) United States Patent
Agrawal et al.

(10) Patent No.: US 7,948,105 B2
(45) Date of Patent: May 24, 2011

(54) TURBOALTERNATOR WITH HYDRODYNAMIC BEARINGS

(75) Inventors: Giridhari L. Agrawal, Simsbury, CT (US); Charles William Buckley, West Hartford, CT (US)

(73) Assignee: R&D Dynamics Corporation, Bloomfied, CT (US)

( * ) Notice: Subject to any disclaimer, the term of this patent is extended or adjusted under 35 U.S.C. 154(b) by 341 days.

(21) Appl. No.: 12/023,429

(22) Filed: Jan. 31, 2008

(65) Prior Publication Data

US 2008/0246281 A1 Oct. 9, 2008

Related U.S. Application Data

(60) Provisional application No. 60/898,896, filed on Feb. 1, 2007.

(51) Int. Cl.
| | |
|---|---|
| F01D 15/10 | (2006.01) |
| F02C 6/00 | (2006.01) |
| H02K 7/18 | (2006.01) |
| H02P 9/04 | (2006.01) |
| B01D 19/00 | (2006.01) |
| F01B 31/00 | (2006.01) |
| F01K 19/00 | (2006.01) |
| F16C 32/06 | (2006.01) |

(52) U.S. Cl. .............................. 290/52; 60/657; 384/105
(58) Field of Classification Search .................... 290/52; 60/657; 384/105
See application file for complete search history.

(56) References Cited

U.S. PATENT DOCUMENTS

| | | | | | |
|---|---|---|---|---|---|
| 3,105,631 | A | * | 10/1963 | Hanny ........................ | 415/175 |
| 3,375,046 | A | * | 3/1968 | Marley ........................ | 384/105 |
| 3,382,014 | A | * | 5/1968 | Marley ........................ | 384/106 |
| 3,635,534 | A | * | 1/1972 | Barnett ........................ | 384/106 |
| 4,171,928 | A | * | 10/1979 | Emerson ...................... | 415/106 |
| 4,209,207 | A | * | 6/1980 | Schippers et al. ............ | 384/123 |
| 4,247,155 | A | * | 1/1981 | Fortmann .................... | 384/124 |
| 4,262,975 | A | * | 4/1981 | Heshmat et al. ............. | 384/119 |
| 4,274,683 | A | * | 6/1981 | Gray et al. ................... | 384/106 |
| 4,277,111 | A | * | 7/1981 | Gray et al. ................... | 384/124 |
| 4,277,112 | A | * | 7/1981 | Heshmat ...................... | 384/124 |
| 4,277,113 | A | * | 7/1981 | Heshmat ...................... | 384/124 |
| 4,295,689 | A | * | 10/1981 | Licht ............................ | 384/103 |
| 4,296,976 | A | * | 10/1981 | Heshmat ...................... | 384/99 |
| 4,300,806 | A | * | 11/1981 | Heshmat ...................... | 384/103 |
| 4,301,375 | A | * | 11/1981 | Anderson .................... | 290/1 R |
| 4,362,020 | A | | 12/1982 | Meacher et al. ............. | 60/657 |
| 4,415,281 | A | * | 11/1983 | Agrawal ...................... | 384/103 |
| 4,552,466 | A | * | 11/1985 | Warren ........................ | 384/103 |
| 4,558,228 | A | | 12/1985 | Larjola ........................ | 290/52 |

(Continued)

OTHER PUBLICATIONS

Agrawal, Giri L., Foil Air/Gas Bearing Technology—An Overview, The American Society of Mechanical Engineers, 1997, pp. 1-11. Publication 97-GT-347, New York.

*Primary Examiner* — T. C. Patel
*Assistant Examiner* — Pedro J Cuevas
(74) *Attorney, Agent, or Firm* — McCormick, Paulding & Huber LLP

(57) ABSTRACT

This invention provides a small, high efficiency, oil-free turbine-driven alternator (i.e. turboalternator) suitable for conversion of stored energy in a process gas to electrical power, facilitating recapture of energy during operation that would otherwise be wasted. The turboalternator includes a turbine and a generating device operatively connected together by a rotating shaft capable of rotating at high speeds. The rotating shaft is supported by foil gas bearings.

19 Claims, 8 Drawing Sheets

U.S. PATENT DOCUMENTS

| | | | |
|---|---|---|---|
| 4,668,106 A * | 5/1987 | Gu | 384/105 |
| 4,699,523 A * | 10/1987 | Hagemeister | 384/103 |
| 5,045,711 A | 9/1991 | Swearingen | 290/52 |
| 5,083,040 A * | 1/1992 | Whitford et al. | 290/52 |
| 5,110,220 A * | 5/1992 | Gu | 384/105 |
| 5,248,205 A * | 9/1993 | Gu et al. | 384/106 |
| 5,318,366 A * | 6/1994 | Nadjafi | 384/106 |
| 5,497,615 A * | 3/1996 | Noe et al. | 60/39.511 |
| 5,498,083 A * | 3/1996 | Brown | 384/106 |
| 5,547,286 A * | 8/1996 | Struziak | 384/105 |
| 5,584,582 A * | 12/1996 | Brown | 384/106 |
| 5,789,824 A * | 8/1998 | Selfors et al. | 290/52 |
| 5,831,341 A * | 11/1998 | Selfors et al. | 290/52 |
| 5,833,369 A * | 11/1998 | Heshmat | 384/105 |
| 5,893,423 A * | 4/1999 | Selfors et al. | 180/65.245 |
| 5,961,217 A * | 10/1999 | Heshmat | 384/105 |
| 5,988,885 A * | 11/1999 | Heshmat | 384/106 |
| 6,046,509 A * | 4/2000 | LaBaire | 290/52 |
| 6,050,727 A | 4/2000 | Messmer et al. | 384/99 |
| 6,158,893 A * | 12/2000 | Heshmat | 384/106 |
| 6,307,278 B1 | 10/2001 | Nims et al. | 290/52 |
| 6,353,273 B1 * | 3/2002 | Heshmat et al. | 310/90.5 |
| 6,505,837 B1 * | 1/2003 | Heshmat | 277/411 |
| 6,523,366 B1 | 2/2003 | Bonaquist et al. | 62/613 |
| 6,608,418 B2 * | 8/2003 | Andres et al. | 310/90.5 |
| RE38,373 E * | 12/2003 | Bosley | 384/106 |
| 6,702,463 B1 * | 3/2004 | Brockett et al. | 384/105 |
| 6,752,533 B2 * | 6/2004 | Saville et al. | 384/105 |
| 6,770,993 B1 * | 8/2004 | Heshmat et al. | 310/90.5 |
| 6,881,027 B2 * | 4/2005 | Klaass et al. | 415/104 |
| 6,948,853 B2 | 9/2005 | Agrawal | 384/105 |
| 6,965,181 B1 * | 11/2005 | Heshmat et al. | 310/90.5 |
| 6,997,686 B2 | 2/2006 | Agrawal et al. | 417/350 |
| 7,021,905 B2 * | 4/2006 | Torrey et al. | 417/356 |
| 7,063,519 B2 | 6/2006 | Agrawal et al. | 417/423.1 |
| 7,070,330 B2 | 7/2006 | Agrawal | 384/106 |
| 7,261,300 B2 * | 8/2007 | Agrawal et al. | 277/399 |
| 7,574,867 B2 * | 8/2009 | Teets et al. | 60/792 |
| 7,624,592 B2 * | 12/2009 | Lui et al. | 62/402 |
| 7,728,475 B2 * | 6/2010 | Himmelmann | 310/90 |
| 7,784,279 B2 * | 8/2010 | Shindo | 60/657 |
| 2003/0038553 A1 * | 2/2003 | Andres et al. | 310/90.5 |
| 2004/0161333 A1 * | 8/2004 | Klaass et al. | 415/111 |
| 2005/0126182 A1 * | 6/2005 | Teets et al. | 60/791 |
| 2007/0266695 A1 * | 11/2007 | Lui et al. | 60/204 |
| 2008/0197634 A1 * | 8/2008 | Himmelmann | 290/52 |
| 2010/0201127 A1 * | 8/2010 | Himmelmann | 290/52 |

* cited by examiner

TURBOALTERNATOR WITH HYDRODYNAMIC BEARINGS

CROSS-REFERENCE TO RELATED APPLICATIONS

This application claims the benefit of U.S. Provisional Application No. 60/898,896, filed Feb. 1, 2007, which is incorporated herein by reference.

FIELD OF THE INVENTION

The present invention relates generally to turbo-machinery, and more particularly to turbine-driven alternators used to convert the stored energy of a process gas into electrical energy. Such turbine-driven alternators, or turboalternators, may be used in various applications, such as compressed air energy storage (CAES), waste gas energy recovery (WGER), pressure letdown, gas liquefaction, and organic Rankine cycles (ORC).

BACKGROUND OF THE INVENTION

Turbine-driven alternators, namely turboalternators, are a key piece of machinery in many different systems for generation of energy. A turbine converts stored energy in a process gas to mechanical energy. An alternator, which is typically coupled to the turbine via a rotating shaft, converts the mechanical energy into electrical energy. The electrical energy is then supplied to a load. Such a turboalternator thus provides a means for converting energy stored in a process gas into electrical energy that is readily available to the user. These devices are especially useful for self-generation of electric energy and local power, and have long been employed in circumstances where power is not readily available from traditional sources, such as in remote locations.

U.S. Pat. No. 5,045,711 describes a prior art turboexpander-generator device typical of devices used on offshore oil/gas platforms where a source of pressurized gas is available and used to generate electricity. This device utilizes a turboexpander, an electric generator, and a lubrication pump, all fixed to a common rotating shaft. The lubrication pump provides oil to bearings supporting the rotating shaft, and further controls an actuator associated with variable inlet nozzles of the turboexpander. Unfortunately, oil-lubricated bearings as used in the device of U.S. Pat. No. 5,045,711 are unreliable, especially at the high running speeds more typical of and expected from modern turbomachinery devices. Further, shaft seals tend to wear out quickly and oil contamination of the process gas becomes a significant problem.

Similar turboalternator devices have attempted to address the deficiencies of oil-lubricated bearings. For example, U.S. Pat. Nos. 4,362,020 and 4,558,228 replace oil-lubricated bearings with hydrodynamic tilting pad bearings in energy conversion turboalternator systems. Unfortunately, titling pad bearings still suffer from high power loss, mechanical complexity, pivot fretting, limited damping capacity and indirect measurement of bearing loading.

An additional common concern with turboalternator devices is the creation of a high thermal signature. Thus, an important aspect of the design of such machinery is the creation of a temperature drop across the turbine. In turn, such a temperature drop allows the device to run more efficiently. In many conventional systems, an orifice plate is used to create a temperature drop isenthalpic expansion (i.e., the Joule-Thomson effect). By replacing the orifice with a turbine, a much higher temperature drop can be achieved, and thus more efficient operation. This occurs because high-pressure gas is expanded to produce work for driving the alternator, an isentropic process where the resultant low-pressure exhaust gas can achieve desirable very low temperature levels.

To achieve high efficiency in such machinery, the turbine must run at high rotational speeds. As rotational speed increases, the overall machine size can be made smaller without compromising the alternator's output power. Heretofore, known problems with turboalternator devices arose due to the excessive size and complexity of such devices. Requirements for running at high speed include properly designed rotating and non-rotating assemblies and bearings to support a high-speed rotating shaft, which, as noted above, permits smaller devices to be used without affecting operative efficiency and power.

Relative velocities for rotating shafts in turboalternator devices are high. For example, the running speed of the rotating shaft for a two-inch diameter turbine rotor is typically 150,000 rpm. The graph in FIG. 13 illustrates optimal operating speeds for a turbine using room temperature air as the process gas. The graph shows that a turbine with 200 psia inlet and 50 lbm/min flow should be run at 80,000 rpm to achieve optimal efficiency.

High-speed rotating machines supported on foil air bearings have made significant progress during the last 35 years. Reliability of many high-speed rotating machines with foil bearings has shown a tenfold increase compared to those with rolling element bearings. Many high-speed rotating machines are Air Cycle Machines (ACM) used in Environmental Control Systems (ECS) of aircraft that manage cooling, heating and pressurization of the aircraft. Today, ACM for almost every new ECS system on military and civilian aircraft and on many ground vehicles use foil air bearings. Old ECS systems with rolling element bearings are being converted to foil air bearings. The F-16 aircraft ACM used rolling element bearings from 1974 to 1982, but all such aircraft built since 1982 use foil air bearings. The 747 aircraft ACM used rolling element bearings from 1970 to 1989. All such aircraft built since 1989 have foil air bearings. ECS on the older model 737 aircraft have rolling element bearings, whereas ECS on the new 737 aircraft use foil air bearings. An overview of foil air bearing technology is provided in an ASME paper (97-GT-347) by Giri L. Agrawal.

The use of foil air bearings in turbomachinery has several advantages:

Oil-Free Operation—There is no contamination with oil. The working fluid in the bearing is the system process gas which could be air or any other gas. For many systems such as gas liquefaction plants, oil-free operation is a necessity.

Higher Reliability—Foil bearing machines are more reliable because there are fewer parts to support the rotating assembly and there is no lubrication needed to feed the system. When the machine is in operation, the air/gas film between the bearing and the shaft protects the bearing foils from wear. The bearing surface is in contact with the shaft only when the machine starts and stops. During this time, a coating on the foils limits the wear.

No Scheduled Maintenance—Since there is no oil lubrication system in machines that use foil bearings, there is never a need to check and replace the lubricant. This results in lower operating cost.

Environmental & System Durability—Foil bearings can handle severe environmental conditions such as shock and vibration loading.

High Speed Operation—Turbine rotors have better aerodynamic efficiency at higher speeds. Foil bearings allow these machines to operate at the higher speeds without any limitation as with ball bearings. In fact, due to the hydrodynamic action, they have a higher load capacity as the speed increases.

Low & High Temperature Capabilities—Many oil lubricants cannot operate at very high temperatures without breaking down. At low temperature, oil lubricants can become too viscous to operate effectively. Foil bearings, however, operate efficiently at severely high temperatures, as well as at cryogenic temperatures.

SUMMARY OF THE INVENTION

The present invention provides a turbine-driven alternator, namely a turboalternator, that can be used in various applications, such as for compressed air energy storage, waste gas energy recovery, pressure letdown, gas liquefaction, and organic Rankine cycling.

In one aspect of the present invention, a turboalternator for recovering energy stored in a process gas comprises a turbine and a generating device. The turbine has a turbine housing with a process gas inlet and a process gas outlet. The generating device has a generating device housing with a power connector for outputting electrical energy. The generating device housing and the turbine housing are attached together to collectively define an interior cavity in which a rotating assembly is disposed. The rotating assembly comprises a rotating shaft mounted for rotation about an axis, a turbine wheel mounted on a first end of the rotating shaft and being disposed within the turbine housing, at least two hydrodynamic foil journal bearing assemblies mounted within the generating device for supporting the rotating shaft, at least one hydrodynamic foil thrust bearing assembly having a thrust runner mounted for rotation with the rotating shaft adjacent a second end thereof opposing the turbine wheel, and a rotor forming an armature of the generating device that is mounted for rotation with the rotating shaft. A tie rod extending along the axis of rotation holds the turbine wheel, the rotating shaft, the at least two journal bearing assemblies, the at least one thrust bearing assembly, and the rotor under preload. The turbine wheel is mounted for rotation about the axis of rotation in association with process gas passing between the turbine housing inlet and outlet, wherein rotation of the turbine wheel effects rotation of the rotating shaft. A stator is mounted in stationary relationship within the generating device housing relative to the rotor, wherein rotation of the rotor relative to the stator generates electrical energy, with the stator being operatively connected to the power connector to supply the generated electrical energy thereto.

In a preferred design and operation of a turboalternator in accordance with the present invention, a turbine wheel is adapted to drive an electric alternator or generator suitable for conversion of stored process gas energy into electrical power. The turbine wheel receives a process gas that causes the turbine wheel to rotate about an axis. The rotating shaft is supported by hydrodynamic foil journal bearings within the housing and operatively communicates with the turbine wheel and the alternator or generator to convert the process gas energy into electrical power by way of shaft work.

In another aspect of the present invention, axial load of the turboalternator may be borne by at least one hydrodynamic foil thrust bearing assembly mounted within the housing.

The present invention avoids the deficiencies of prior art devices that utilize, for example, oil-lubricated bearings or tilting pad bearings, by supporting the rotating shaft in hydrodynamic foil gas bearings. Such foil gas bearings do not require a supply of pressurized gas as with some prior art turboalternator devices. Further, such foil gas bearings overcome limitations associated with prior art devices, including high power loss, mechanical complexity, pivot fretting, limited damping capacity, indirect measurement of bearing loading, high thermal signature, fuel inefficiency, noise, vibration, increased size and weight, required scheduled maintenance, oil contamination, and higher costs. The use of foil gas bearings moreover provides the advantages of enabling running at high speeds desired for optimum turbine efficiency and machine reliability without compromising output power or without increasing machine size.

In another aspect of the present invention, a turboalternator in accordance with the present invention may be used in a power generating system wherein the turboalternator is operatively connected to an auxiliary unit for supplying a process gas to the turbine housing inlet to effect rotation of the turbine wheel. Such a power generating system has applicability in several applications and set-ups requiring conversion of a process gas into electrical energy and power readily available to the user, including the following:

Compressed Air Energy Storage (CAES) refers to the compression of air during periods of low energy demand, for use in meeting periods of higher demand. Typically, compression is done with an electrically powered turbo-compressor; and expansion is done with a natural-gas powered heater which drives a turbine driven generator. Air can be stored underground in a cavern created by solution mining (salt is dissolved away) or an abandoned mine. Plants are designed to operate on a daily cycle, charging at night and discharging during the day.

Turboexpander-Generator (also referred to as "turbo expander", "expansion turbine" or simply "expander") is a centrifugal or axial flow turbine through which a high-pressure gas is expanded to produce work that is used to drive a compressor or generator. Because work is extracted from the expanding high pressure gas, the expansion is isentropic and the low-pressure exhaust gas from the turbine is at a very low temperature, often as low as −300° F. or less. Turboexpanders are very widely used as sources of refrigeration in industrial processes such as: the extraction of ethane as well as natural gas liquids (NGLs) from natural gas; the liquefaction of gases; and other low-temperature processes.

Pressure Letdown Stations refers to commercial processing plants that use pressure reducing valves (PRV) to letdown the process gas (oftentimes steam) to lower pressure. An example is the production of cheese where 125 psig saturated stream is used for pasteurization, 80 psig for curd processing and <60 psig for mixing, drying and cleaning. Replacing the PRV with a turboalternator allows for recovery of otherwise wasted energy.

Waste Gas Energy Recovery (WGER) refers to the extraction of usable energy from industrial process gas that would otherwise be dumped to atmosphere. A turboalternator can be used to extract energy from low pressure gas to recover energy and improve system overall efficiency. An example of WGER is a turboalternator installed in the exhaust of an internal combustion engine used to generate electricity from the engines exhaust. A turboalternator could be used in series or parallel with a turbocharger.

Organic Rankine Cycle (ORC) refers to a system used to extract usable energy from low grade waste heat, such as industrial waste heat, geothermal heat, solar thermal power and solar ponds. These systems are used where the pressure of the waste stream is too low to be directly utilized through a turbine. depending on the temperature of the heat source, many different process fluids are used, such as pentane, butane, R-134a, R-245fa, etc.

These and other features of the present invention are described with reference to the drawings of preferred embodiments of a turbo-driven alternator device, its components, and various applications for such device. The illustrated embodiments of the turbine-driven alternator device of the present invention are intended to illustrate, but not limit features of the invention.

DETAILED DESCRIPTION OF THE INVENTION

Figure 1:
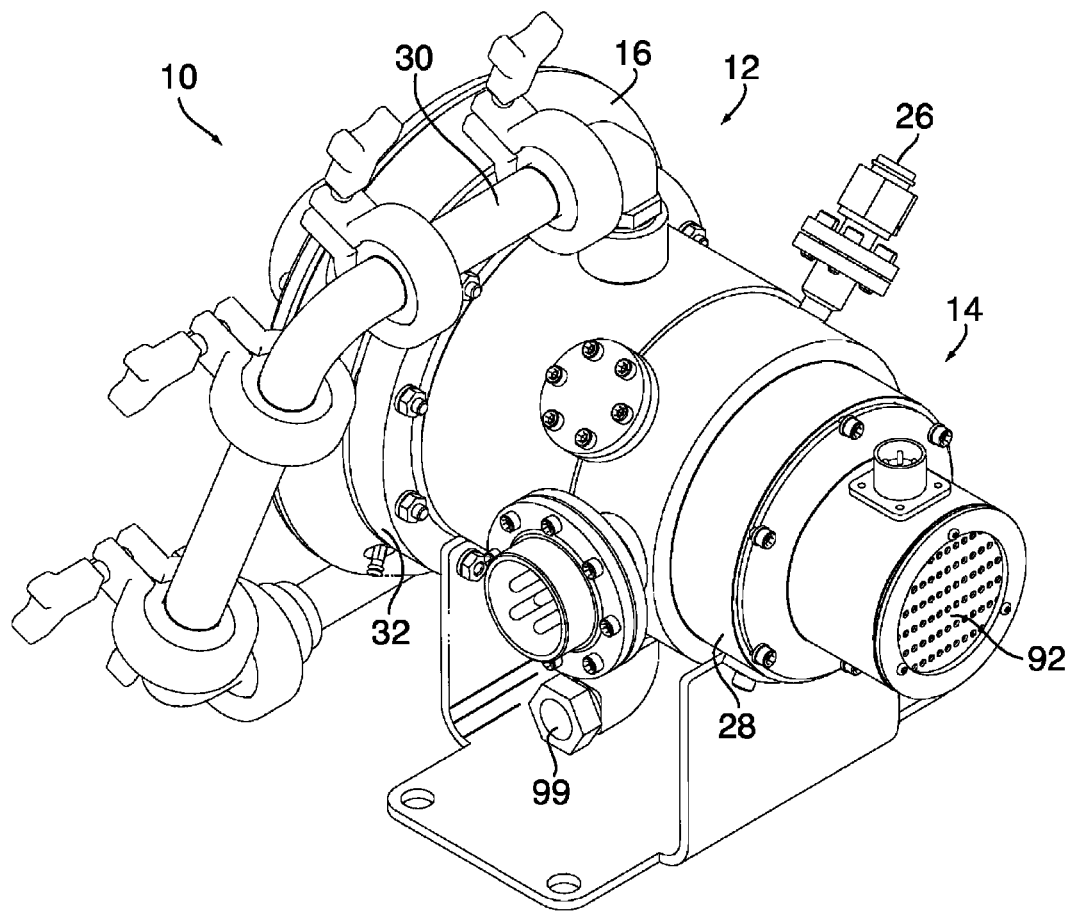
FIG. 1 is an isometric view of a turboalternator in accordance with a preferred embodiment of the present invention.
Figure 2:
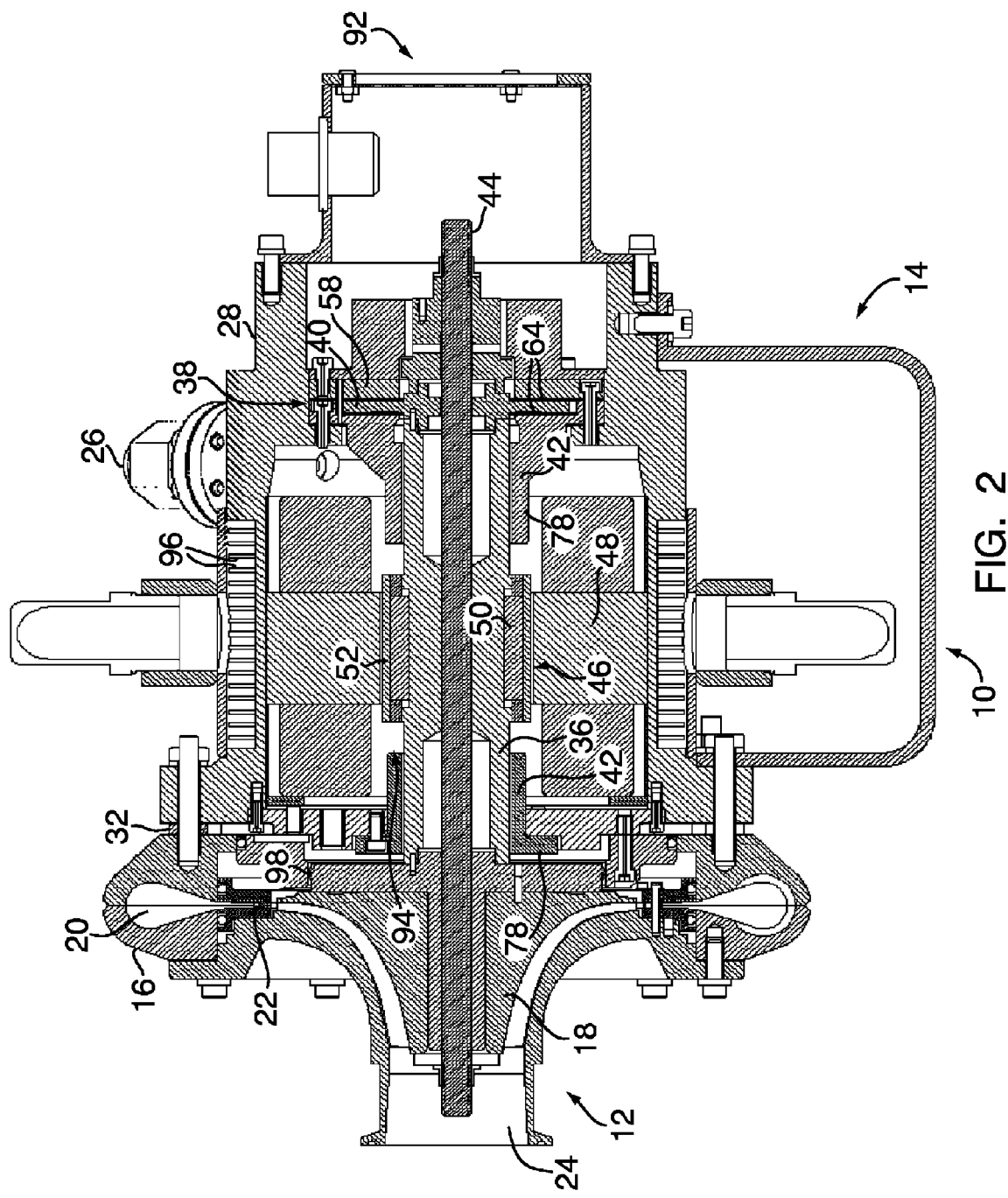
FIG. 2 is an axial cross-section of the turboalternator of FIG. 1.

The present invention is directed to a power generating system for recovering energy stored in a process gas. A perspective view and cross-section of an exemplary turbine-driven alternator in accordance with the present invention, generally designated by reference numeral 10 and hereinafter referred to as "turboalternator 10", are illustrated in FIGS. 1 and 2, respectively. Turboalternator 10 is preferably a small, high efficiency, oil-free device that can be used in various applications, such as for compressed air energy storage, waste gas energy recovery, pressure letdown, gas liquefaction, and organic Rankine cycles.

The turboalternator 10 generally comprises a turbine 12 and a generating device 14, such as an alternator or a generator. In general, the turboalternator of the present invention operates the same regardless of whether the generating device is an alternator or a generator. Hereinafter, the generating device 14 is described with reference to a generator. However, this description equally applies to a device using an alternator as the generating device 14.

The turbine 12 includes a turbine housing 16 defining an interior space within which a turbine wheel or rotor 18 is rotatably mounted. A process gas enters the turbine 12 through an inlet 20, is directed through a fixed inlet nozzle 22 (FIG. 4), and exits the turbine housing 16 through a turbine housing outlet 24 (e.g., an exducer). In general, high-pressure process gas passes through the turbine 12 between the inlet 20 and the outlet 24 and causes the turbine wheel 18 to rotate about an axis of rotation. The nozzle 22 increases the process gas' kinetic energy prior to moving through the turbine 12.

Upon rotation of the turbine wheel 18, the turbine 12 converts mechanical energy to shaft work, which, in turn, is converted to electric power by the generator 14 of the turboalternator 10. The electrical energy or power is withdrawn from the generator 14 through a power connector 26 provided on a generator housing 28. The electrical outlet of the power connector 26 may provide power to any desirable machinery, power storage unit or the like. Generally, the power output is AC power. In the event that a DC output is desired, power can pass through additional power electronics, not shown but generally known to the person of ordinary skill in the art.

As shown in FIG. 1, the turboalternator 10 may include a transition pipe 30 connecting the generator 14 and the turbine 12. Generally, the process gas may be used as a coolant medium circulated through the generator housing 28 to cool internal operative components of the generator 14. After cooling of the generator 14, the coolant medium can be routed to the turbine housing 16 via the transition pipe 30 and accordingly used as the process gas for effecting rotation of the turbine wheel 18. Cooling aspects of the present invention are described in more detail below.

An insulator plate 32 is fixed between the turbine housing 16 and the generator housing 28. This insulator plate 32 minimizes heat transfer between the turbine side and the generator side of the turboalternator 10. Such insulation prevents components from overheating, controls the thermal signature of the device, and therefore improves the overall efficiency of the turboalternator 10.

Figure 3:
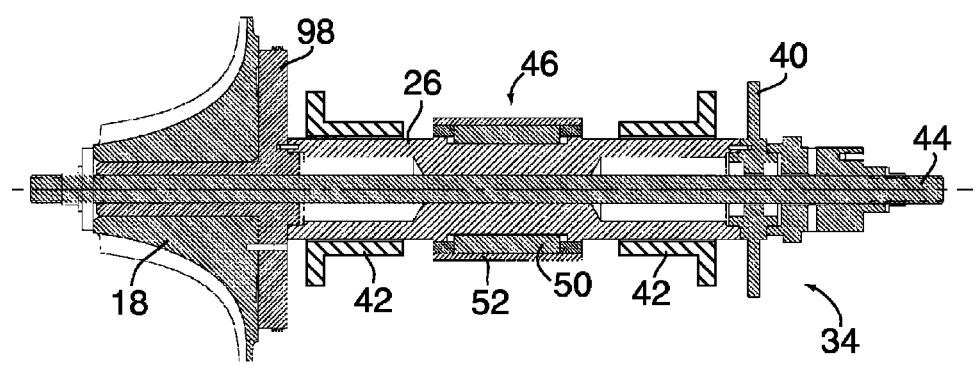
FIG. 3 is an axial cross-section of a rotating assembly used in the turboalternator of FIG. 1.
Figure 5:
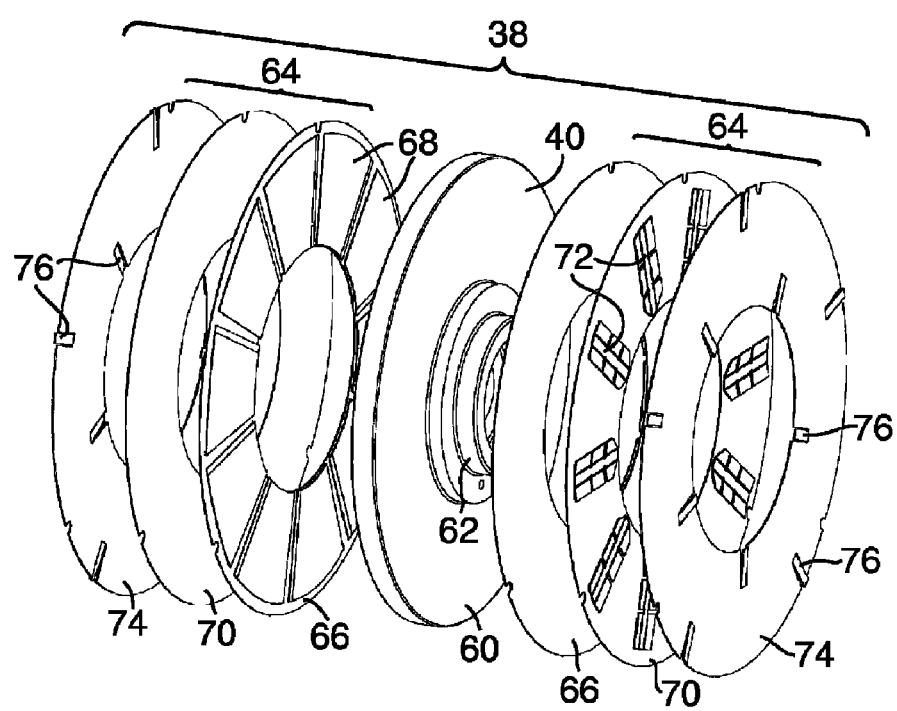
FIG. 5 is an exploded view of a thrust bearing assembly used in the turboalternator of FIG. 1.

FIG. 3 provides a cross-sectional view of an exemplary rotating assembly, generally designated as reference numeral 34, for use in the turboalternator 10 of the present invention. As illustrated, the rotating assembly 34 generally comprises the turbine wheel 18 mounted at a first end thereof within the turbine housing 16. A rotating shaft 36 is fixed to the turbine wheel 18 and generally extends the length of the generator housing 28. A thrust runner 40, part of a hydrodynamic fluid film thrust bearing assembly 38 discussed in more detail below with reference to FIG. 5, is mounted at an end of the rotating shaft 36 opposing the turbine wheel 18. The rotating shaft 36 is mounted and supported for rotation within the turboalternator 10 about a central longitudinal axis by two hydrodynamic fluid film journal bearing assemblies 42 generally positioned at opposing ends of the rotating shaft 36. The journal bearing assemblies 42, in connection with the thrust bearing assembly 38, act to bear the axial loads exerted by the rotating assembly 34, especially at high operating speeds. A tie rod 44 clamps the elements of the rotating assembly 34 together and rigidly holds them under a pre-load to counteract any centrifugal loading while the turboalternator 10 operates at high speeds.

In operation of the turboalternator 10 of the present invention, the rotating assembly 34 is preferably driven by rotation of the turbine wheel 18 about the axis of rotation. Shaft rotation, generally in the range of 60,000 to 80,000 rpm, effects operation of the generator 14. Preferably, the generator 14 is a permanent magnet generator comprising a generator rotor 46 and a generator stator 48 relatively positioned with respect to one another to generating electrical energy upon rotation of the generator rotor 46 with respect to the stationary generator stator 48. More specifically, the generator rotor 46 is mounted on the rotating shaft 36 at an intermediate position between the opposing ends of the rotating assembly 34, generally between the journal bearing assemblies 42. In a preferred design, the generator rotor 46 includes a permanent magnet 50 and a non-magnetic retaining sleeve 52. The retaining sleeve 52 may include a metallic cylinder press fit over the magnet 50 with end caps to protect the magnet 50. Alternatively, the retaining sleeve 52 may take the form of non-metallic fiber wound around the magnet 50. As so situated and designed, the generator rotor 46 acts as the generator's armature for driving the rotating assembly 34. The generator stator 48 is supported in the generator housing 28 around the generator rotor 46, with coils (not shown) encircling the generator rotor 46 to operatively interact with the permanent magnet 50.

Figure 4:
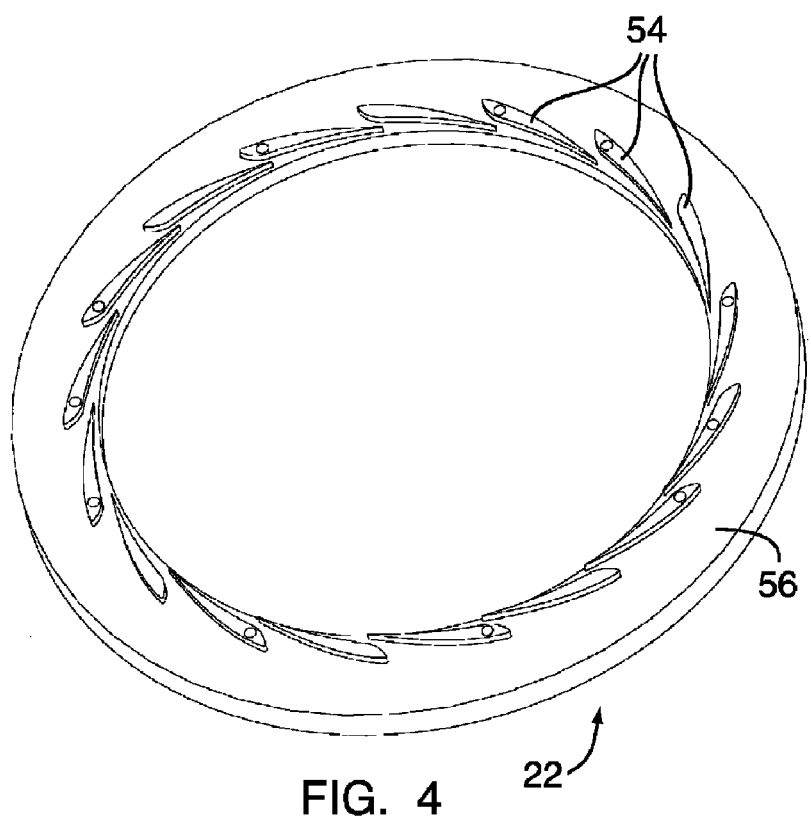
FIG. 4 is an isometric view of a turbine nozzle used in the turboalternator of FIG. 1.

Referring to FIG. 4, an exemplary turbine nozzle 22 for use in the present invention is shown. Generally, the turbine nozzle 22 comprises a series of vanes 54 arranged radially on an annular plate 56 to control the flow of the process gas. The nozzle 22 is preferably a convergent design used to increase the kinetic energy of the process gas stream and also to direct the process gas into and through the turbine 12 at an optimum angle. The nozzle 22 may have either fixed geometry (as shown) or variable geometry (not shown).

Referring to FIG. 5, an exploded view of an exemplary thrust bearing assembly 38 for use with the present invention is shown. Preferably, the thrust bearing assembly 38 uses oil-less foil gas bearings, and more preferably, high spring-rate, high load capacity, hydrodynamic foil gas thrust bearings. Such foil gas bearings have numerous performance, maintenance and operating advantages over conventional bearings for turboalternators, as discussed in the Background Section above. The illustrated thrust bearing assembly 38 is of the type shown and described in U.S. Pat. No. 6,948,853, having a common assignee herewith and incorporated herein by reference. Generally, the illustrated thrust bearing assembly 38 includes the thrust runner 40 disposed within a thrust bearing housing portion 58 of the generator housing 28 and having an annular-shaped portion 60 extending radially from and circumscribing a hub 62. The hub 62 may slide over or alternatively form a section of the rotating shaft 36, as seen in FIG. 3, so that the thrust runner 40 is capable of rotation in coordination with rotation of the rotating shaft 36.

Typically, the thrust runner 40 has first and second opposed axial sides, which act as thrust carrying surfaces. In a preferred design, at least one thrust bearing 64 is provided on a respective axial side of the thrust runner 40. Each thrust bearing 64 includes a thrust bearing plate 66 with multiple top foils 68 disposed thereon, and a spring plate 70 with multiple leaf springs or flat springs 72 disposed thereon. An additional resilient plate 74 is provided outwardly adjacent to each spring plate 70 and includes additionally spring elements 76 to provide added resiliency to the thrust bearing assembly 38.

In operation, each thrust bearing plate 66, spring plate 70, and resilient plate 74 are preferably kept stationary within the bearing housing portion 58 of the generator housing 28 relative to the thrust runner 40 to aid in distribution of axial loads. Thus, the thrust bearing assembly 38 supports and transmits the axial load of the rotating assembly 34 through the entire assembly in a distributed fashion. In order to further meet high load capacity requirements of a rotating machine, such as turboalternator 10, two or more thrust bearing assemblies may be used to share the loads.

Figure 6:
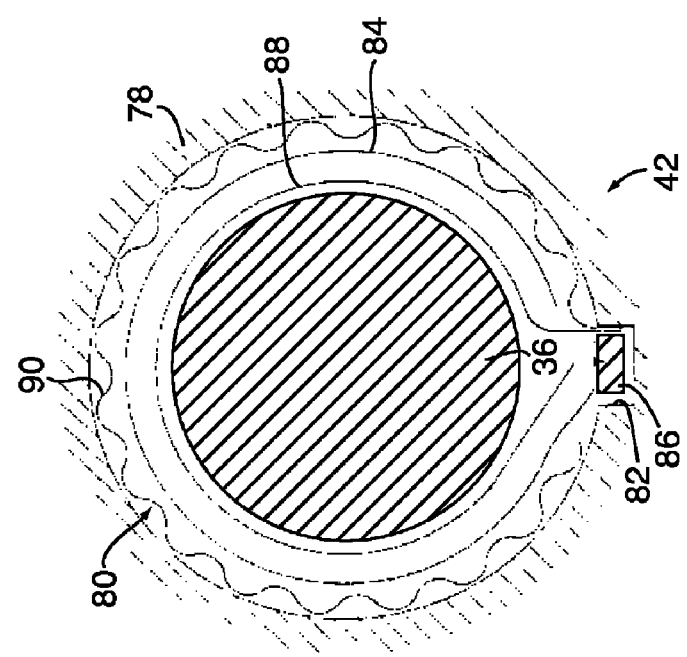
FIG. 6 is a cross-section of a journal bearing assembly used in the turboalternator of FIG. 1.

Referring to FIG. 6, a cross-sectional view of an exemplary hydrodynamic fluid film journal bearing assembly 42 for use with the present invention is shown. Preferably, the journal bearing assemblies 42 use oil-less, foil gas journal bearings, and more preferably, high spring-rate, high load capacity, hydrodynamic foil gas journal bearings. Generally, the illustrated journal bearing assembly 42 includes a stationary retaining sleeve or bearing housing 78, generally illustrated in FIG. 2 as separate components mounted in the generator housing 28. Though shown in FIG. 2 as separate components, the retaining sleeves 78 may be integral with the generator housing 28, as generally illustrated in FIG. 6. The retaining sleeve 78 encloses the rotating shaft 36, providing radial support therefore. Together, the retaining sleeve 78 and the rotating shaft 36 define an annular spacing or clearance 80. Typically, the retaining sleeve 78 includes an inner surface having a longitudinally extending keyway 82 formed therein.

A first open or split, generally cylindrical-shaped, smooth foil element 84 is disposed with the annular spacing 80 and is fixed along an edge to a side of a key 86 slidably received within the keyway 82. A second open or split, generally cylindrical-shaped, smooth foil element 88 is provided inwardly of, concentric to, and overlapping the first foil element 84 within the annular spacing 80. An end portion of the second foil element 88 is disposed within the keyway 82. A corrugated resilient backing member or spring 90 is disposed within the annular spacing 80 between the retaining member and the foil elements 84, 88. An end portion of the spring 90 is also disposed within the keyway 82.

The journal bearing assembly 42 operates under the basic principle of generation of hydrodynamic pressure in the portion of the annular spacing 80 between the rotating shaft 36 and the foil elements 84 and 88. During starting and stopping of rotation of the rotating shaft 36, the second foil element 88 often rubs against the rotating shaft 36 until a fluid film is created. As the rotating shaft 36 rotates, regions of high pressure and low-pressure between the rotating shaft 36 and the foil elements 84 and 88 are established and maintained, and fluid flows from a high-pressure zone to a low-pressure zone resulting in a squeezing of the fluid between the rotating shaft 36 and the foil elements 84 and 88. This phenomenon defines supporting fluid film that supports radial loads on the journal bearing assembly 42 and prevents the rotating shaft 36 from contacting the foil elements 84 and 88. Moreover, enhanced coulomb damping is achieved in the journal bearing assembly 42 by a rubbing of the second foil element 88 against the first foil element 84, and the first foil element 84 against the spring 90, with the general movement of the foil elements 84 and 88 and the spring 90 being in opposite directions within the annular spacing 80 to the adjacent element so as to achieve greater energy dissipation and damping than movement of the foil elements in the same direction.

As shown in FIGS. 2 and 3, the turboalternator 10 of the present invention preferably utilizes two journal bearing assemblies 42 disposed within the generator housing 28 at opposing end of the rotating shaft 36 flanking the stator 48. Though the journal bearing assemblies are described and illustrated with respect to FIG. 6, the journal bearing assembly used in accordance with the present invention may alternatively be of the type shown and described in U.S. Pat. No. 7,070,330, having a common assignee herewith and incorporated herein by reference.

Figure 7:
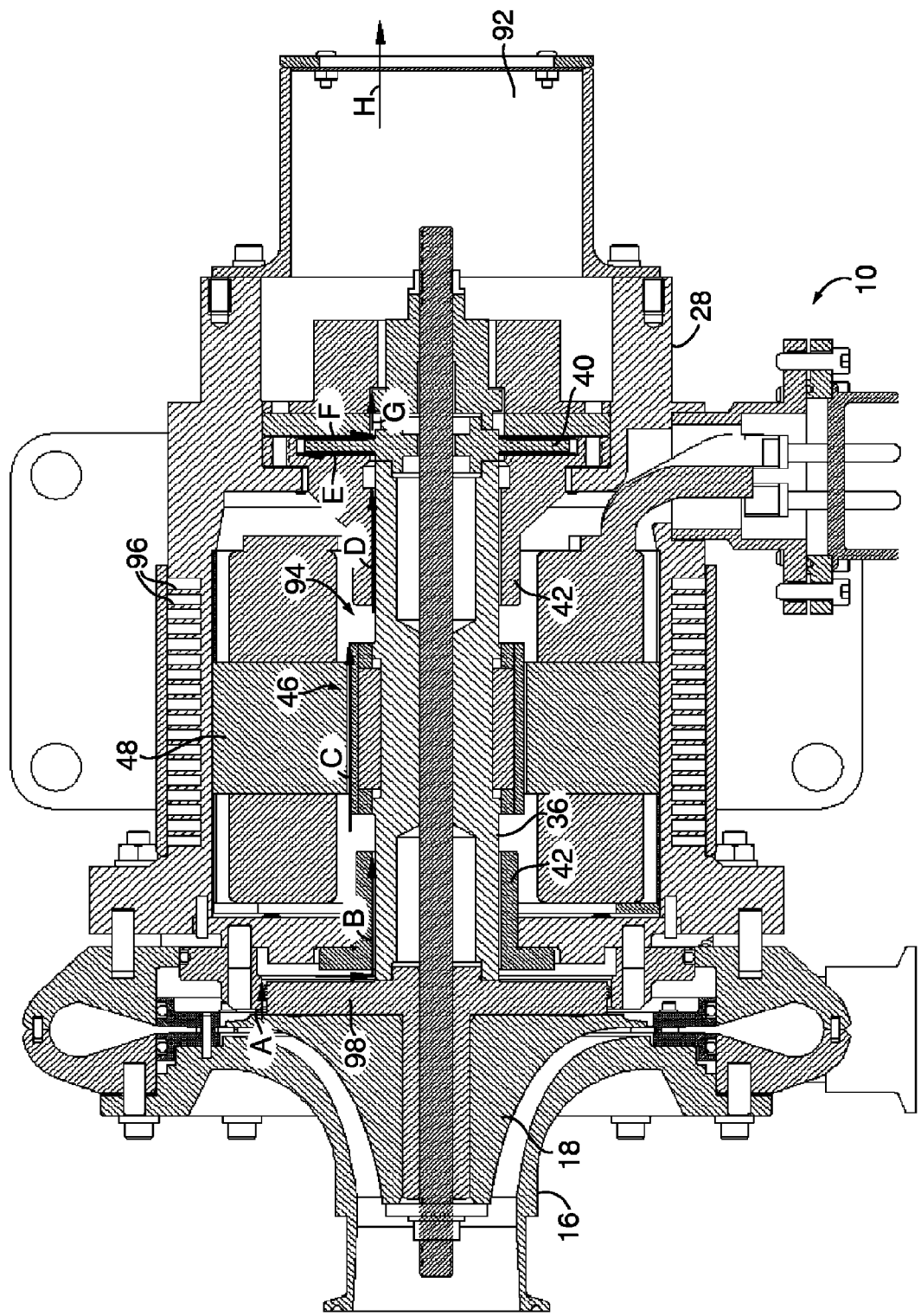
FIG. 7 is an axial cross-section of the turboalternator of FIG. 1 showing the preferable internal cooling flow path.

The turboalternator of the present invention also provides for self-cooling of its operating components. As shown in FIG. 7, a small amount of process gas is permitted to leak through the turboalternator 10 to cool the generator stator 48, the journal bearing assemblies 42 and the thrust bearing assembly 38, before the process gas flows out of the device to either the atmosphere through a generator exhaust outlet 92 shown in FIG. 1, or recycled back to a low-pressure part of the turboalternator 10. Cooling of the stator 48 is more particularly provided by liquid or gas flowing through a cooling jacket defined within the generator housing 28—e.g., an annular cooling passage 94 extending between a cooling inlet and a cooling outlet for the generator housing 28. Preferably, cooling fins 96 are provided on the interior surface of the generator housing 28 to aid in circulation of the coolant medium along a prescribed cooling path. Internal cooling flow of process gas also removes heat from the generator rotor 46 that is produced from eddy current losses in the permanent magnet 50 and the retaining sleeve 52.

The amount of process gas leakage permitted into the generator housing 28 can be regulated by a seal 98 disposed between the turbine housing 16 and the generator housing 28. The seal 98 is preferably a labyrinth seal that is sized to minimize axial thrust and balance thrust load, while providing a metered amount of cooling gas to flow through the generator housing along the path marked by the arrows in FIG. 7. Specifically, the clearance between the seal 98 and the turbine housing wall will determine how much process gas can leak into the generator housing 28. Once the process gas has leaked into the annular cooling passage 94 (arrow A), it flows across a first journal bearing assembly 42 (arrow B), then through the spacing between the generator rotor 46 and the generator stator 48 (arrow C), across a second journal bearing assembly 42 (arrow D), across both axial faces of the thrust bearing runner 40 (arrows E and F), out past the end of the rotating shaft 36 (arrow G), and then out the exhaust outlet 92 of the generator housing 28 (arrow H).

Various cooling media can be used to cool the generator stator 48. Typically, the cooling medium selected depends on the specific application. In an organic Rankine cycle, for example, liquid refrigerant or water may be used to cool the system. The liquid can be provided to the turboalternator from an external cooling liquid supply (not shown). In a CAES system, compressed inlet air may be used to cool the generator stator 48 before entering the turbine housing 16, thereby increasing the turbine inlet temperature and further increasing the overall efficiency of the system. In such a system, a coolant medium is introduced to the generator housing 28 through a cooling inlet (e.g., through inlet 99 shown in FIG. 1). The coolant medium circulates through the interior cooling jacket of the generator housing 28. Finally, the exhaust of cooling gas is recycled from a cooling outlet of the generator housing 28 back to the inlet 20 of the turbine housing 16 (e.g., through transition pipe 30 shown in FIG. 1). In other applications where the turbine exhaust is cool, the turbine outlet gas may be circulated through the generator housing 28 to cool the generator stator 48.

Though the turboalternator of the present invention is shown as a single stage turbine-driven device, the present invention may also utilize a two-stage turbine-driven device without deviating from the focus of the present invention. Moreover, such two-stage devices may use one stage on either end of the rotating assembly, or multiple stages on one end of the rotating assembly.

FIGS. 8-12 provide various schematic depictions of a turboalternator or similar power generating system in accordance with the present invention in various applications for recovering energy stored in a process gas and making said energy readily available to a user.

Figure 8:
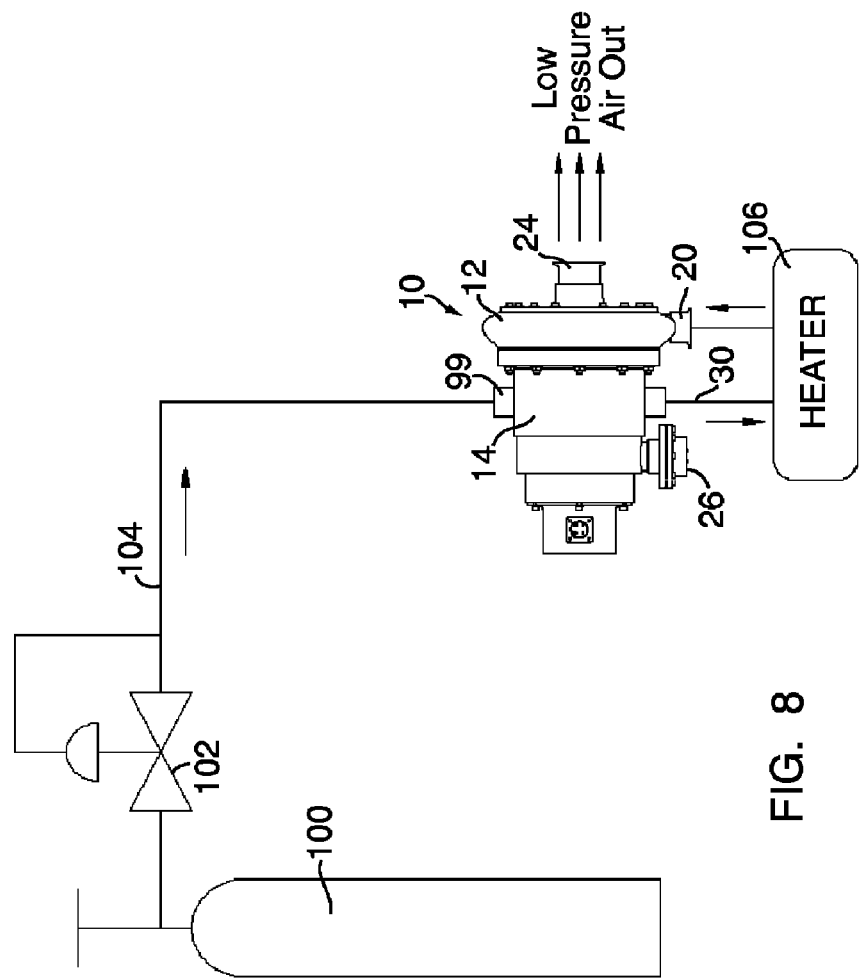
FIG. 8 is a schematic depiction of a turboalternator in accordance with the present invention used for compressed air energy storage (CAES).

FIG. 8 is a schematic depiction of the turboalternator 10 used in a compressed air energy storage (CAES) system. In such a system, compressed air at a very high pressure is stored in a storage vessel 100. When electric power is required, such as during a power failure, a regulating valve 102 opens and stored air is drawn through a first feed line 104 and sent to a cooling jacket in the generator housing 28 to cool the generator stator 48 and other internal operative components of the rotating assembly 34. The coolant medium, after exiting the cooling jacket of the generator housing 28 may then be fed to the turbine 12 via a transition pipe 30 (as shown in FIG. 1). Additionally, the coolant medium can be heated by a heater, such as a natural gas powered heater 106 illustrated in the schematic of FIG. 8. The heated process air passes through the turbine 12 to atmosphere via the turbine housing outlet 24, effecting rotation of the turbine wheel 18 as it passes through the turbine housing 16. Moreover, as the air passes through the turboalternator 10, the turbine 12 converts the energy stored in the air to shaft work. The generator 14 of the turboalternator 10 converts the shaft work to electric power, which is fed by electrical power connector 26 to any desirable machinery, storage unit or the like. Inlet air drawn from the first feed line 104 provides cooling for the generator 14, which, in turn, preheats the air moving on to the turbine 12 via a second feed line, namely, the transition pipe 30. By using the process air to cool the generator 14, and likewise using the generator 14 (as well as an additional optional heater 106) to heat the process air before it is sent to the turbine 12, the overall efficiency of the CAES system is improved. Moreover, efficiency of the system is improved by using the same air as a coolant medium and heated process air to pass through the turbine 12, where the stored energy in the air can be converted to electrical energy.

Figure 9:
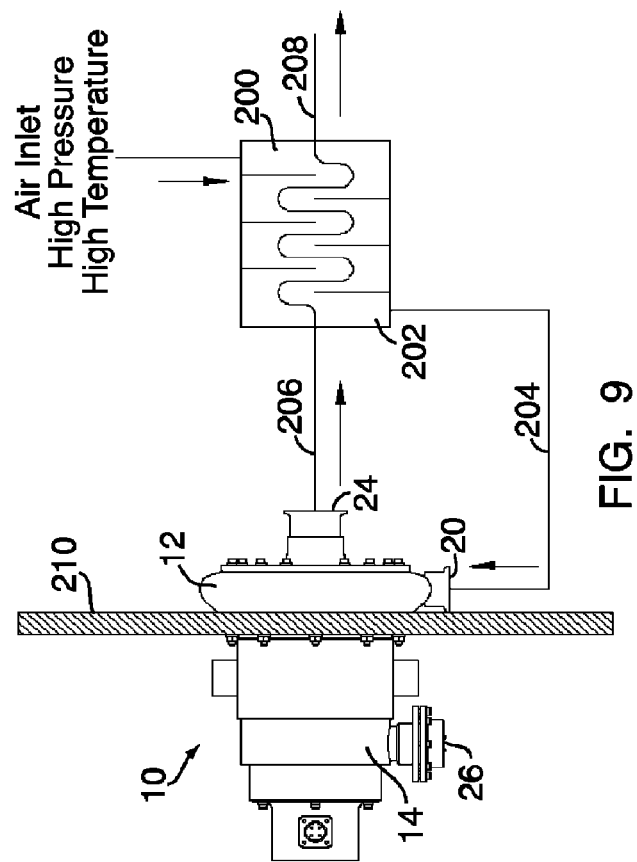
FIG. 9 is a schematic depiction of a turboalternator in accordance with the present invention used as a turboexpander in a cryogenic process.

FIG. 9 is a schematic depiction of the turboalternator 10 used as a turboexpander-generator in a cryogenic process. More particularly, the turboalternator 10 is used to drop the temperature of a process gas. As shown, the turboalternator 10 is used in conjunction with a heat exchanger 200 to provide extremely low temperatures for air separation and refrigeration plants. High pressure, high temperature process air is drawn into and through the heat exchanger 200. The process air passes out a feed outlet 202 and through a first feed line 204 to the turbine 12. The air passes through the turbine 12 to generate mechanical energy by means of rotating turbine wheel 18. Low-pressure air passes out of the turbine 12 via the turbine outlet 24 and through a second feed line 206 to the heat exchanger 200. Low pressure, low temperature air passes out of the heat exchanger 200 via exhaust outlet 208 to the atmosphere. Again, the turbine 12 of the turboalternator 10 converts mechanical energy to shaft work, which, in turn, is converted to electric power by the generator 14 of the turboalternator 10, which is fed by electrical power connector 26 to any desirable machinery, storage unit or the like. Where the turboalternator 10 is used with the heat exchanger 200, the generator 14 is preferably insulated from the turbine 12 and the heat exchanger 200. As shown, an insulation wall 210 is provided between the generator 14 and the turbine 12, and can be an extension of the insulating plate 32 provided on the turboalternator in accordance with a preferred design.

Figure 10:
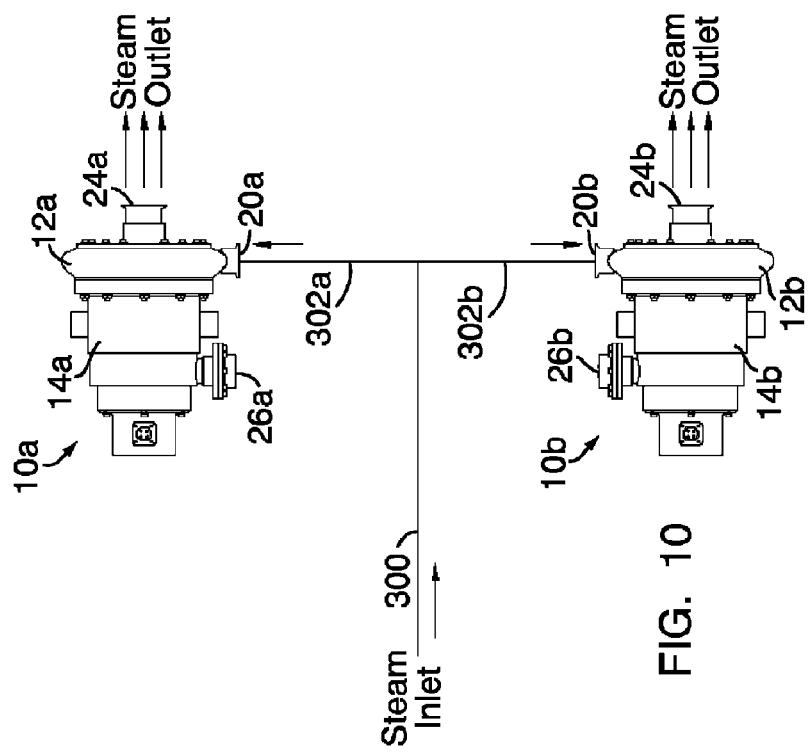
FIG. 10 is a schematic depiction of turboalternators in accordance with the present invention used as a pressure letdown station.

FIG. 10 is a schematic depiction of a system where a turbine-driven alternator device in accordance with the present invention is used as a pressure letdown station. As shown, two turboalternators 10a and 10b may be used for the letdown process, each with a respective turbine 12a or 12b and generator 14a or 14b. The turbine component of each turboalternator 10a or 10b reduces the pressure of the process gas to a desired value while generating electrical power. Typical industrial processes use pressure-reducing valves to drop the pressure to desired levels for specific processes. Pressure-reducing valves are effective at reducing pressure, but waste significant amounts of energy that could be recaptured. The turboalternators of the present invention allow for recapturing much of that energy.

As shown in FIG. 10, a steam supply is introduced to the pressure letdown station via steam inlet 300. For illustration purposes, the inlet steam supply is about 125 psig. This supply is split so as to be directed to the first and second turboalternator 10a and 10b via first and second feed lines 302a and 302b, respectively. The steam supply through first feed line 302a passes through the first turbine 12a, which generates mechanical energy by rotating turbine wheel 18a. The mechanical energy is converted to shaft work, which, in turn, is converted to electric power by the first generator 14a of the first turboalternator 10a, which power is fed by first electrical power connector 26a to any desirable machinery, storage unit or the like. The process steam exits the first turbine 12a to a first steam header via first turbine housing outlet 20a. Likewise, the steam supply through second feed line 302b passes through the second turbine 12b, which generates mechanical energy by rotating turbine wheel 18b. The mechanical energy is converted to shaft work, which, in turn, is converted to electric power by the second generator 14b of the second turboalternator 10b, which power is fed by second electrical power connector 26b to any desirable machinery, storage unit or the like. The process steam exits the second turbine 12b to a second steam header via second turbine housing outlet 24b. For illustration purposes, the outlet steam supply from first turboalternator 10a is about 80 psig, while the outlet steam supply from second turboalternator 10b is about 60 psig.

Figure 11:
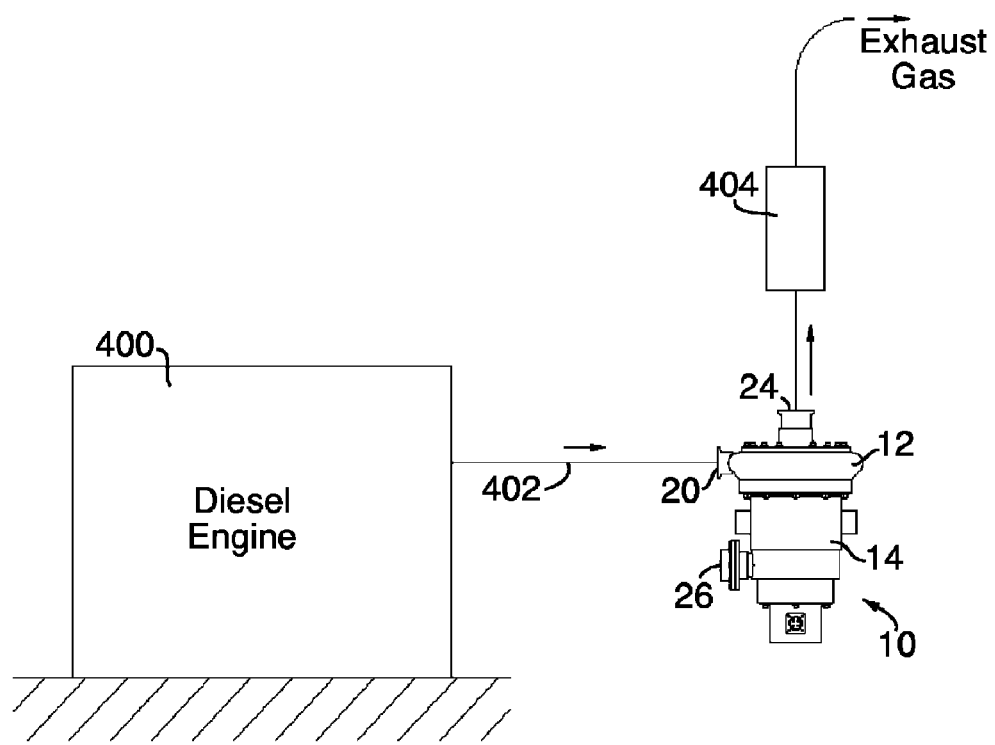
FIG. 11 is a schematic depiction of a turboalternator in accordance with the present invention used for Waste Gas Energy Recovery (WGER).

FIG. 11 is a schematic depiction of a turboalternator in accordance with the present invention used for waste gas energy recovery (WGER). In this application, the turboalternator 10 uses the exhaust from a diesel engine 400 to generate electricity that would otherwise be wasted. Internal combustion engines reject 40% of the fuels energy in the exhaust stream. Recovering this energy reduces emission, improves fuel economy and enables power growth. The exhaust, acting as a process gas supply, passes from the engine 400 to the turbine 12 of the turboalternator 10 via an inlet feed line 402. The turbine 12 generates mechanical energy by rotating turbine wheel 18. The mechanical energy is converted to shaft work, which, in turn, is converted to electric power by the generator 14 of the turboalternator 10, which power is fed by an electrical power connector 26 to any desirable machinery, storage unit or the like. The process exhaust exits the turbine 12 via a muffler 404 to atmosphere. The turboalternator 10 can be used alone or in series with a turbocharger (not shown) for turbocompounding.

Figure 12:
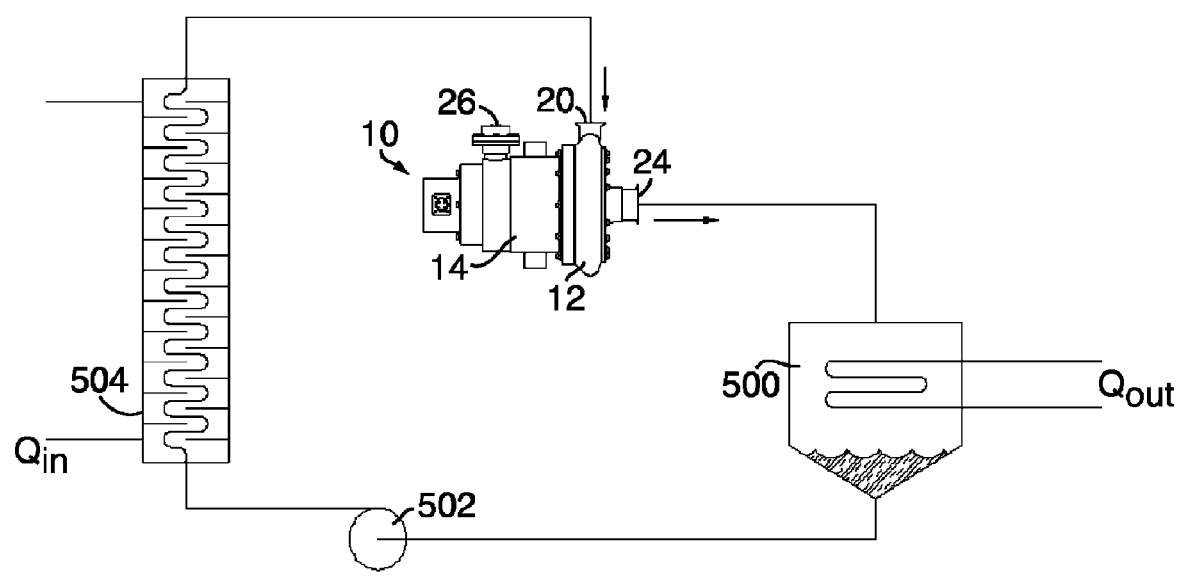
FIG. 12 is a schematic depiction of a turboalternator in accordance with the present invention used in an organic Rankine cycle (ORC).
Figure 13:
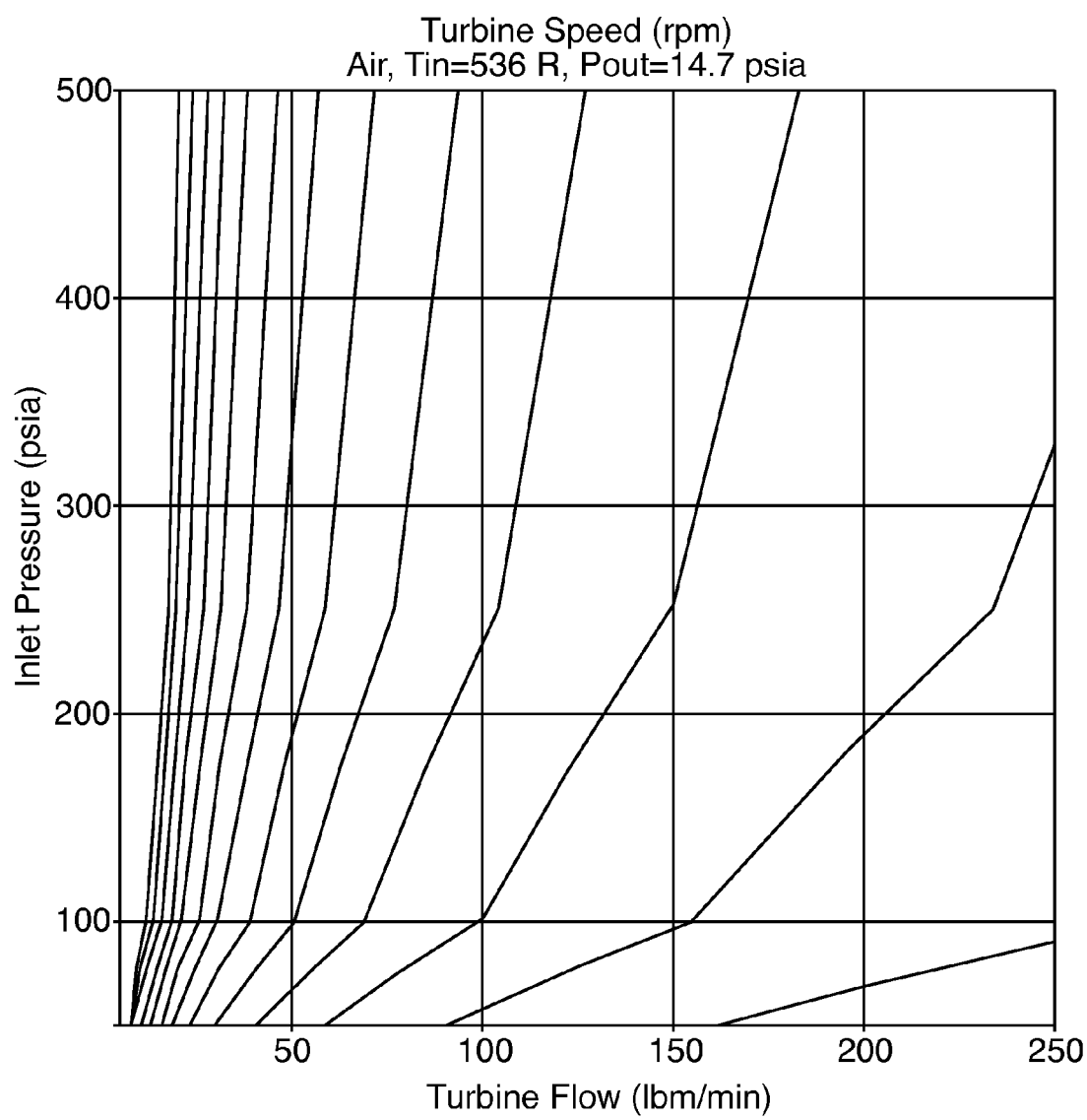
FIG. 13 provides a chart showing optimal operating speeds for a turbine using room temperature air as the process gas.

FIG. 12 is a schematic depiction of a turboalternator in accordance with the present invention used in an organic Rankine cycle (ORC). In this application, the turboalternator 10 uses high pressure process gas, such as pentane, butane, R-134a, R-245fa or the like, to operate the turboalternator 10. The system comprises a condenser 500, a feed pump 502, and an evaporator 504. The condenser 500 is operatively connected to the turbine housing outlet 24 for receiving process gas discharged therefrom. Typically, the process gas exhausted from the turboalternator 10 is in a low-pressure gaseous form. The low-pressure process gas is condensed in the condenser 500 into a fluid form. The feed pump 502 is operatively connected to the condenser 500 for drawing the process fluid from the condenser 500 and directing it, at high pressure, to the evaporator 504, which is operatively connected to an outlet of the feed pump 502. Upon exiting the feed pump 502, the high-pressure process fluid passes through the evaporator 504 where the process fluid is transformed from a fluid form to a vapor form as it is heated by low-grade waste heat circulated through the evaporator 504. The high pressure, high temperature process gas then passes through the turboalternator 10, where energy stored in the process gas is converted to electrical power. The process gas is discharge from the turboalternator 10 at a relatively low pressure and temperature, and is directed to the condenser 500 to repeat the cycle.

The foregoing description of embodiments of the invention has been presented for the purpose of illustration and description, it is not intended to be exhaustive or to limit the invention to the form disclosed. Obvious modifications and variations are possible in light of the above disclosure. The embodiments described were chosen to best illustrate the principals of the invention and practical applications thereof to enable one of ordinary skill in the art to utilize the invention in various embodiments and with various modifications as suited to the particular use contemplated. It is intended that the scope of the invention be defined by the claims appended hereto.

What is claimed is:

1. A self-contained, turboalternator for recovering energy stored in a process gas regardless of whether said turboalternator is vertically or horizontally oriented, said turboalternator comprising:
    an ultra high-speed, aircraft type turbine having a turbine housing with a process gas inlet and a process gas outlet;
    a generating device having a generating device housing with a power connector for outputting electrical energy, wherein the generating device housing and the turbine housing are attached together to collectively define an interior cavity;
    a rotating assembly disposed within the interior cavity, said rotating assembly comprising:
        a rotating shaft mounted for rotation about an axis;
        a turbine wheel mounted on a first end of the rotating shaft and being disposed within the turbine housing, said turbine wheel being mounted for rotation about the axis in association with process gas passing between the inlet and the outlet of the turbine housing, and wherein rotation of the turbine wheel effects rotation of the rotating shaft;
        at least two hydrodynamic foil journal bearing assemblies mounted within the generating device housing for supporting the rotating shaft;
        at least one hydrodynamic foil thrust bearing assembly having a thrust runner mounted for rotation with the rotating shaft adjacent a second end thereof opposing the turbine wheel;
        a rotor forming an armature of the generating device, said rotor being mounted for rotation with the rotating shaft; and
        a tie rod extending along the axis of rotation and holding the turbine wheel, the rotating shaft, the at least two journal bearing assemblies, the at least one thrust bearing assembly, and the rotor under preload;
    a stator mounted in stationary relationship within the generating device housing relative to the rotor, wherein rotation of the rotor relative to the stator generates electrical energy, said stator being operatively connected to the power connector to supply said generated electrical energy to said power connector; and
    a seal disposed between the turbine housing and the generating device housing, said seal permitting a metered amount of process gas to flow from the turbine housing into the generating device housing to act as the coolant medium therein.

2. The turboalternator as defined in claim 1, wherein the generating device housing includes a cooling jacket for cooling the generating device stator, said cooling jacket being formed in the interior cavity of the generating device housing and defining a cooling path for coolant medium through the generating device housing.

3. The turboalternator as defined in claim 2, wherein at least a portion of the process gas flowing from the turbine housing into the generating device housing acts as the coolant medium directed into and through the cooling jacket formed in the generating device housing.

4. The turboalternator as defined in claim 2, wherein the coolant medium directed into and through the cooling jacket includes a liquid coolant.

5. The turboalternator as defined in claim 2, wherein the cooling path circulates the coolant medium between a cooling inlet and a cooling outlet of the cooling jacket, said cooling jacket further defining an intermediate portion of the cooling path that surrounds the stator and the rotating shaft so that the coolant medium passes the stator and the rotating shaft during a cooling cycle.

6. The turboalternator as defined in claim 5, wherein the cooling path inlet is defined by a gap between the seal and the turbine housing and the cooling outlet is defined by an exhaust in the generating device housing, and further wherein the cooling path circulates process gas acting as the coolant medium between the cooling inlet and the cooling outlet so that it flows through at least a first journal bearing assembly, a gap defined between the rotor and the stator, a second journal bearing assembly, and around the thrust runner.

7. The turboalternator as defined in claim 5, further comprising a transition pipe connecting the cooling outlet of the generating device housing with the turbine housing inlet.

8. The turboalternator as defined in claim 7, wherein the cooling path flows from the cooling inlet, through the cooling jacket, out the cooling outlet, through the transition pipe, into the turbine housing inlet, and out the turbine housing outlet.

9. The turboalternator as defined in claim 1, further comprising an insulator plate disposed between the turbine housing and the generating device housing for minimizing heat transfer between the turbine and the generating device of said turboalternator.

10. The turboalternator as defined in claim 1, wherein each journal bearing assembly comprises:
a stationary bearing housing having an inner surface defining a cylindrical opening for receiving the rotating shaft;
a first generally cylindrical foil element disposed within and lining a portion of the cylindrical opening;
a second generally cylindrical foil element disposed within the cylindrical opening in overlapping relationship to the first foil element; and
a generally cylindrical resilient backing member disposed within the cylindrical opening generally concentric to and radially outward from the first and second foil elements;
wherein the first and second foil elements extend in opposite circumferential directions within the cylindrical opening so that free ends thereof overlap one another.

11. The turboalternator as defined in claim 1, wherein the thrust runner of the at least one thrust bearing assembly includes an annular-shaped portion having generally opposite axial thrust-carrying sides, said thrust bearing assembly further comprising:
an annular thrust bearing plate adjacent each axial side of the thrust runner, each thrust bearing plate having two opposite axial sides and including on one axial side a plurality of foils in confronting relationship with the axial side of the thrust runner;
an annular spring plate adjacent the axial side of each thrust bearing plate opposite said one side, said spring plate including a plurality of springs; and
an annular resilient plate provided outwardly adjacent each spring plate.

12. The turboalternator as defined in claim 1, wherein the rotor includes a permanent magnet encapsulated by a retaining sleeve.

13. A power generating system for recovering energy stored in a process gas, comprising
a self-contained, turboalternator comprising:
an ultra high-speed, aircraft type turbine having a turbine housing with a process gas inlet and a process gas outlet;
a generating device having a generating device housing with a power connector for outputting electrical energy, wherein the generating device housing and the turbine housing are attached together to collectively define an interior cavity;
a rotating assembly disposed within the interior cavity, said rotating assembly comprising:
a rotating shaft mounted for rotation about an axis;
a turbine wheel mounted on a first end of the rotating shaft and being disposed within the turbine housing, said turbine wheel being mounted for rotation about the axis in association with process gas passing between the inlet and the outlet of the turbine housing, and wherein rotation of the turbine wheel effects rotation of the rotating shaft;
at least two hydrodynamic foil journal bearing assemblies mounted within the generating device housing for supporting the rotating shaft;
at least one hydrodynamic foil thrust bearing assembly having a thrust runner mounted for rotation with the rotating shaft adjacent a second end thereof opposing the turbine wheel;
a rotor forming an armature of the generating device, said rotor being mounted for rotation with the rotating shaft;
a stator mounted in stationary relationship within the generating device housing relative to the rotor, wherein relative rotation between the rotor and the stator generates electrical energy, said stator being operatively connected to the power connector to supply said generated electrical energy to said power connector;
wherein said turboalternator may be vertically, horizontally or otherwise oriented during operation;
a seal disposed between the turbine housing and the generating device housing, said seal permitting a metered amount of process gas to flow from the turbine housing into the generating device housing to act as a coolant medium therein; and
an auxiliary unit operatively connected to the turboalternator for supplying the process gas to the turbine housing inlet to effect rotation of the turbine wheel.

14. The power generating system as defined in claim 13, wherein the generating device housing includes a cooling inlet and a cooling outlet defining a cooling path through the generating device housing;
wherein the auxiliary unit comprises:
a storage vessel for the process gas; and
a first feed line operatively connected to the cooling inlet of the generating device housing for supplying process gas directly to the generator device housing to act as a second coolant medium;

wherein said turboalternator further comprises a transition pipe operatively connecting the cooling outlet of the generating device housing with the process gas inlet of the turbine housing; and further wherein the process gas flowing from the turbine housing into the generator housing mixes with the second coolant medium within the generator device housing and exits via the cooling outlet.

15. The power generating system as defined in claim 13, wherein the auxiliary unit comprises a heat exchanger comprising:
- a first inlet for receiving a process gas to pass through the heat exchanger to a first outlet;
- a first feed line operatively connecting the first outlet to the process gas inlet of the turbine housing; and
- a second feed line operatively connecting the process gas outlet of the turbine housing with a second inlet of the heat exchanger; and
- a second outlet for exhausting the process gas from the heat exchanger;
- wherein process gas is drawn into the heat exchanger at a first pressure level and is exhausted from the heat exchanger after passing through the turboalternator at a second pressure level that is lower than the first pressure level.

16. The power generating system as defined in claim 15, further comprising an insulator plate disposed between the turbine housing and the generating device housing for minimizing heat transfer between the turbine and the generating device of said turboalternator.

17. The power generating system as defined in claim 13, wherein the auxiliary unit comprises a diesel engine having a feed line operatively connected with the process gas inlet of the turbine housing; said system further comprising an exhaust muffler operatively connected to the process gas outlet of the turbine housing.

18. The power generating system as defined in claim 13, comprising a first turboalternator and a second turboalternator, each including a respective turbine and generating device;
- a first feed line operatively connecting the auxiliary unit with the process gas inlet of the first turbine; and
- a second feed line operatively connecting the auxiliary unit with the process gas inlet of the second turbine;
- wherein the auxiliary unit comprises a steam supply.

19. The power generating system as defined in claim 13, wherein the auxiliary unit comprises:
- a condenser operatively connected with the turbine housing outlet for receiving process gas discharged therefrom at a first pressure level, said condenser adapted to condense the process gas into a fluid form;
- a feed pump operatively connected to the condenser for drawing the process fluid therefrom; and
- an evaporator operatively connected to an outlet of the feed pump, said evaporator adapted to convert the process fluid into a gaseous form and thereafter feed the process gas to the turbine housing inlet at a second pressure level that is greater than the first pressure level.

* * * * *